United States Patent Office 3,637,777
Patented Jan. 25, 1972

3,637,777
ORGANOTIN BIS(MONOORGANO MALEATES)
Samuel Hoch, Brooklyn, N.Y., assignor to
Tenneco Chemicals, Inc.
No Drawing. Filed Feb. 5, 1969, Ser. No. 796,900
Int. Cl. C07f 7/22; C08f 45/56
U.S. Cl. 260—429.7
4 Claims

ABSTRACT OF THE DISCLOSURE

Clear polyvinyl chloride resin compositions contain as stabilizer a liquid organotin compound having the structural formula

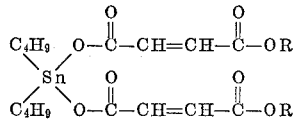

wherein each R represents a branched-chain alkyl group, an alkenyl group, or a hydroxy-alkenyl group, each of said groups having from 16 to 18 carbon atoms.

---

This invention relates to stabilizers for vinyl halide resins and to resinous compositions stabilized therewith. More particularly, it relates to stabilized rigid polyvinyl chloride resin compositions that are characterized by excellent heat stability, color, and clarity.

Organotin compounds are widely used as heat stabilizers for vinyl halide resins. Since most of these compounds do not have lubricating properties, they are ordinarily used in combination with lubricants so that the resinous compositions can be processed satisfactorily at elevated temperatures. Among the small group of organotin compounds that have lubricating properties and hence can be used with very small amounts of lubricant or no added lubricant are the di-n-butyltin (monoalkyl maleates) in which the alkyl group has from 16 to 18 carbon atoms arranged in a straight chain. These compounds, however, are not completely satisfactory as stabilizers for vinyl halide resin compositions because at room temperature they are waxy solids that are difficult to handle. In addition they impart an undesirable haze to the finished resinous sheets because they are not completely compatible with vinyl halide resins.

In accordance with this invention, it has been found that certain liquid organotin compounds are excellent thermal stabilizers for vinyl halide resins. These low-viscosity liquids have excellent handling characteristics. They have lubricating properties that are in many cases superior to those of the aforementioned di-n-butyltin (monoalkyl maleates). Because these organotin compounds are completely compatible with polyvinyl chloride and other vinyl halide resins, compositions containing them can be formed into sheets that show little or no haze. In addition compositions stabilized with these liquid organotin compounds have excellent thermal stability, excellent color and color retention, and other valuable properties.

The liquid organotin stabilizers of this invention have the structural formula

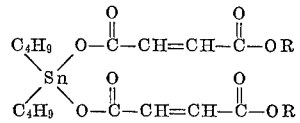

wherein each R represents a branched-chain alkyl group having from 16 to 18 carbon atoms, an alkenyl group having from 16 to 18 carbon atoms, or a hydroxy alkenyl group having from 16 to 18 carbon atoms. Illustrative of these liquid organotin compounds are the following:

di-n-butyltin bis (mono-2-hexyldecyl maleate),
di-n-butyltin bis (mono-2-octyldecyl maleate),
di-n-butyltin bis (mono-9-octadecen-1-yl maleate),
di-n-butyltin bis (mono-8-hexadecen-1-yl maleate),
di-n-butyltin bis (mono-12-hydroxy-9-octadecen-1-yl maleate),
di-n-butyl bis (mono-16-hydroxy-7-hexadecen-1-yl maleate), and the like.

One of these liquid organotin compounds or a mixture of two or more of them may be present in the stabilized resin compositions of this invention.

The liquid organotin compounds may be prepared by any suitable and convenient procedure. For example, they may be prepared by heating the appropriate monoester of maleic acid with di-n-butyltin oxide. This reaction is generally carried out in a solvent, such as benzene, toluene, or xylene.

Only a small amount of the liquid organotin compound need be present in the stabilized compositions of this invention. It has been found that as little as 1 percent of the stabilizer, based on the weight of the vinyl halide resin, will bring about an appreciable improvement in the heat stability of the composition. Approximately 10 percent or more of the stabilizer can be used, but these larger amounts generally do not provide further improvement in the properties of the resinous compositions and for this reason are not ordinarily used. In most cases approximately 2 percent to 5 percent of the stabilizer, based on the weight of the vinyl halide resin, gives most advantageous results.

This invention is of particular value in the stabilization of rigid polyvinyl chloride composition, that is, compositions which are formulated to withstand temperatures of at least 350° F. The novel stabilizers can also be used in plasticized vinyl halide resin compositions of conventional formulation where high softening point is not a requisite. The vinyl halide resins that may be employed in such compositions include both vinyl halide homopolymers, such as polyvinyl chloride, polyvinyl bromide, and polyvinylidene chloride and copolymers, such as those formed by the polymerization of a vinyl halide with up to about 30 percent of a comonomer, such as vinyl acetate, vinyl propionate, vinylidene chloride, styrene, methyl methacrylate, ethylene, and the like. The invention is also applicable to mixtures of a vinyl halide resin in a major proportion with a minor proportion of other synthetic resins, such as chlorinated polyethylene, polyacrylate and polymethacrylate esters, polyacrylonitrile, and terpolymers of acrylonitrile, butadiene, and styrene. Any of the well-known plasticizers for vinyl halide resins can be used including dioctyl phthalate, dibutyl sebacate, tricresyl phosphate, and octyl diphenyl phosphate.

In addition to the ingredients described, the stabilized resinous compositions may contain other resin additives, such as pigments, dyes, extenders, processing aids, fillers, and light stabilizers, in the amount ordinarily employed for the purposes indicated.

The stabilized vinyl halide resin compositions may be prepared by any convenient procedure. It is generally preferred to blend the stabilizer with the vinyl halide resin using plastic mixing rolls at a temperature at which the mix is fluid and to mill the composition on a two-roll mill at from 300° F. to 400° F. for a time sufficient to form a homogeneous sheet. The plasticizer, if one is employed, and other additives may be incorporated with the stabilizer. The stabilized composition may then be removed from the mill in the form of a sheet or film of the desired thickness which may be used as such or subjected to a polishing or embossing treatment.

The invention is further illustrated by the examples that follow. In these examples all parts and percentages are parts by weight and percentages by weight.

EXAMPLE 1

To a mixture of 106.5 grams (0.44 mole) of isohexadecyl alcohol (2-hexyldecano) and 50.0 grams of benzene was added 43.0 grams (0.44 mole) of maleic anhydride. This mixture was heated at 70°–100° C. for one hour and then cooled to 60° C. To the reaction mixture was added 54.5 grams (0.22 mole) of di-n-butyltin oxide. The reaction mixture was heated at its reflux temperature (100°–110° C.) until 4 ml. of water had been collected in the Dean-Stark water trap. The benzene was removed by distillation under atmospheric pressure, and the product was filtered. The di-n-butyltin bis (monoisohexadecyl maleate) obtained was a clear, water-white, low viscosity liquid that contained 13.0 percent Sn.

EXAMPLE 2

To a mixture of 111.4 grams (0.42 mole) of oleyl alcohol (9-octadecen-1-ol) and 50.0 grams of benzene was added 40.7 grams (0.42 mole) of maleic anhydride. The reaction mixture was heated at 70°–100° C. for one hour and then cooled to 60° C. To the reaction mixture was added 51.6 grams (0.21 mole) of di-n-butyltin oxide. The reaction mixture was heated at its reflux temperature until 3.7 ml. of water had been collected in the Dean-Stark water trap. The benzene was removed by distillation under atmospheric pressure, and the product was filtered. The di-n-butyltin bis (monooleyl maleate) obtained was a clear, light yellow, low-viscosity liquid that contained 12.3 percent Sn.

EXAMPLE 3

To a mixture of 57.3 grams (0.20 mole) of ricinoleyl alcohol (9-octadecen-1,12-diol) and 50.0 grams of benzene was added 19.7 grams (0.20 mole) of maleic anhydride. The reaction mixture was heated at 70°–100° C. for one hour and then cooled to 60° C. To the reaction mixture was added 25.0 grams (0.10 mole) of di-n-butyltin oxide. The reaction mixture was heated at its reflux temperature until 1.8 ml. of water had been collected in the Dean-Stark water trap. The benzene was removed by distillation under atmospheric pressure, and the product was filtered. The di-n-butyltin bis (monoricinoleyl maleate) obtained was a clear, light yellow liquid that contained 11.9 percent Sn.

EXAMPLE 4

A series of stabilized polyvinyl chloride resin compositions was prepared by the following procedure:

To a mixture of 100 parts of polyvinyl chloride (Tenneco 10R), 15 parts of an acrylonitrile-butadiene-styrene terpolymer (Blendex 401), 4.0 parts of an acrylic resin (K–120N), 1.35 parts of glyceryl monoricinoleate, 0.5 part of stearyl stearate, and 0.001 part of blue dye (Alizarine Irisol Blue) was added 2.8 parts of one of the stabilizers of this invention or a comparative stabilizer.

The mixture were blended at room temperature and then charged to a two-roll, steam-heated mill whose roll surface was maintained at 340° F. The mixtures were milled for 5 minutes and then removed from the mill as homogeneous sheets either 35 or 45 mils thick. Strips cut from the sheet were press-polished in a Watson-Stillman press at 350° F. The clarity of the plaques prepared is set forth in the table that follows:

TABLE

| Example Number | Stabilizer | Clarity of plaques |
|---|---|---|
| 4A | Di-n-butyltin bis (monoisohexadecyl maleate). | Clear. |
| 4B | Di-n-butyltin bis (monooleyl maleate). | Do. |
| 4C | Di-n-butyltin bis (monoricinoleyl maleate). | Do. |
| Composition Example 1. | Di-n-butyltin bis (mono-n-hexadecyl maleate). | Slight haze. |
| Composition Example 2. | Di-n-butyltin bis (mono-n-octadecyl maleate). | Moderate haze. |

The heat stability of the compositions was determined by placing 1 x 1 specimens which had been cut from the milled sheets in forced-circulation ovens at 350° F. and 375° F. and removing specimens periodically until degradation was complete as indicated by color change. The compositions of this invention and the comparative compositions had excellent long term heat stability; the compositions of this invention were slightly superior in early color hold to the comparative compositions.

The terms and expressions that have been employed are used as terms of description and not of limitation. There is no intention in the use of such terms and expressions of excluding any equivalents of the features shown and described or portions thereof. It is recognized that various modifications are possible within the scope of the invention claimed.

What is claimed is:

1. A liquid organotin compound having the structural formula

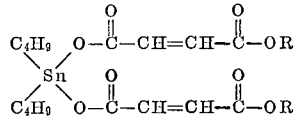

wherein each R represents a branched-chain alkyl group having from 16 to 18 carbon atoms, an alkenyl group having from 16 to 18 carbon atoms, or a hydroxy alkenyl group having from 16 to 18 carbon atoms.

2. A liquid organotin compound as set forth in claim 1 wherein each R represents a 2-hexyldecyl group.

3. A liquid organotin compound as set forth in claim 1 wherein each R represents an oleyl group.

4. A liquid organotin compound as set forth in claim 1 wherein each R represents a ricinoleyl group.

References Cited

UNITED STATES PATENTS

| 2,857,413 | 10/1958 | Weinberg | 260—429.7 |
| 3,019,247 | 1/1962 | Mack | 260—429.7 |
| 3,067,167 | 12/1962 | Lynn et al. | 260—429.7 X |
| 3,296,289 | 1/1967 | Gloskey | 260—429.7 |

TOBIAS E. LEVOW, Primary Examiner

W. F. W. BELLAMY, Asssitant Examiner

U.S. Cl. X.R.

260—45.75 K